(12) United States Patent
Xiang et al.

(10) Patent No.: US 7,754,656 B2
(45) Date of Patent: Jul. 13, 2010

(54) PRODUCTION OF NANO-POWDER BASED COMBINATORIAL LIBRARIES

(75) Inventors: Xiao-Dong Xiang, Danville, CA (US); Young K. Yoo, Walnut Creek, CA (US); Yi-Qun Li, Walnut Creek, CA (US); Daesig Kim, Colorado Springs, CO (US); Sohrab Erfanian, Danville, CA (US)

(73) Assignee: Intematix Corporation, Fremont, CA (US)

( * ) Notice: Subject to any disclaimer, the term of this patent is extended or adjusted under 35 U.S.C. 154(b) by 841 days.

(21) Appl. No.: 11/251,562

(22) Filed: Oct. 13, 2005
(Under 37 CFR 1.47)

(65) Prior Publication Data
US 2008/0070801 A1    Mar. 20, 2008

Related U.S. Application Data

(60) Provisional application No. 60/618,803, filed on Oct. 13, 2004.

(51) Int. Cl.
*C40B 30/00* (2006.01)
(52) U.S. Cl. .......................................... 506/7
(58) Field of Classification Search ........................ None
See application file for complete search history.

(56) References Cited

U.S. PATENT DOCUMENTS

| | | | |
|---|---|---|---|
| 3,941,567 A | 3/1976 | Combaz | |
| 4,916,115 A | 4/1990 | Mantese et al. | |
| 5,958,348 A | 9/1999 | Bi et al. | |
| 6,080,337 A | 6/2000 | Kambe et al. | |
| 6,225,007 B1 | 5/2001 | Horne et al. | |
| 6,254,928 B1 * | 7/2001 | Doan | 427/212 |
| 6,723,606 B2 | 4/2004 | Flagan et al. | |
| 6,788,866 B2 * | 9/2004 | Bryan | 385/129 |

OTHER PUBLICATIONS

Bie et al. (1993) "Nanocrystalline α-Fe, $Fe_3C$, and $Fe_7C_3$ produced by $CO_2$ laser pyrolysis." *Journal of Materials Research*, 8(7): 1666-1674.
Cannon et al. (1982) "Sinterable Ceramic Powers from Laser-Driven Reactions: I, Process Description and Modeling." *Journal of the American Ceramic Society*, 65(7): 324-335.

* cited by examiner

*Primary Examiner*—Jeffrey S. Lundgren
(74) *Attorney, Agent, or Firm*—Quine Intellectual Property Law Group, P.C.; Stephen J. LeBlanc

(57) ABSTRACT

The present invention relates to methods and apparatus for synthesizing combinatorial materials libraries using pyrolysis techniques. In certain embodiments, the methods involve varying the precursors and/or reactant gases in an operating pyrolysis unit to continuously vary the resulting nanoparticle composition and collecting different nanoparticles at different locations on a substrate using a spatially addressable particle collector.

27 Claims, 13 Drawing Sheets

PRODUCTION OF NANO-POWDER BASED COMBINATORIAL LIBRARIES

CROSS-REFERENCE TO RELATED APPLICATIONS

This application claims benefit of and priority to U.S. Ser. No. 60/618,803, filed on Oct. 13, 2004, which is incorporated herein by reference in its entirety for all purposes.

STATEMENT AS TO RIGHTS TO INVENTIONS MADE UNDER FEDERALLY SPONSORED RESEARCH AND DEVELOPMENT

Not Applicable

FIELD OF THE INVENTION

The present invention relates to methods and apparatus for synthesizing combinatorial materials libraries using pyrolysis techniques.

BACKGROUND OF THE INVENTION

There is currently considerable commercial and scientific interest in the production of nanopowders. A variety of nanopowder materials including carbon (diamond, diamond-like carbon, fullerenes, graphitic carbon), other elemental materials (metals, semiconductors), non-oxide ceramics, metal oxides, organics, polymers, and composites can be produced by numerous methods. Typically, many parameters are optimized for the synthesis of any particular nano-particle and each sample for a particular set of parameters in an experiment is collected individually for characterization. This process is expensive and time consuming.

One approach to speed up materials development has been the generation of large collections (libraries) of molecules and the systematic screening of those collections for molecules having a desired property. Using this approach, methods have been developed for the synthesis and screening of large libraries (up to $10^{14}$ molecules) of biomolecules, e.g., peptides, oligonucleotides, and the like. Biomolecules have proven amenable for the production large libraries because they are readily synthesized in a stepwise manner using monomeric precursors.

The development of libraries of inorganic materials, particularly libraries that vary in a systematic manner with respect to material properties has proven considerably more problematic. Typically conventional chemical synthetic methods have been used to produce each material and then the materials have been combined to form a combinatorial library.

The development of improved combinatorial synthesis and library formation methods it will dramatically accelerate the development and application of functional inorganic materials.

SUMMARY OF THE INVENTION

This invention provides in situ and/or a multi-step approach for the systematic synthesis of materials libraries comprising large numbers of nano-sized inorganic compounds with different compositions, stoichiometry, particle size, and the like. The approach provides considerable over material composition, size, stoichiometry, and the like.

Among various powder-forming methods, we determined that pyrolysis, in particular laser pyrolysis, is the best method for this purpose. Thus in certain embodiments, this invention provides methods and apparatus for synthesizing multi-component nanopowders-(nanoparticle-) based combinatorial libraries using laser pyrolysis methods. The size of nanopowders produced typically ranges from 1 nm or 10 nm to about 100 nm or about 500 nm in diameter.

Various precursor sources are available in this system for the synthesis of multi-component powders, including gas, liquid and solid sources. The ratio of input sources are continuously changed with time at designed compositional ratios. As the composition of input sources varies, nanopowders with different compositions are produced and collected in a spatially addressable substrate or sequentially collected with individual sample collectors. In certain embodiments, source delivery units comprise CVD injectors or precursor sources driven by carrier gases. In addition, multi reaction chambers are provided in series for continuous step by step reactions, where specific reactions take place in designed manner. This multi-step process avoids or minimizes the formation of undesired composites and give rise to precise tailoring of phase and composition of powders. Finally, precise source control and unique powder collection methods allow the system to produce multiple samples of nanopowders with varying chemical compositions in an highly effective way.

Definitions

The term "substrate" as used herein refers to a material or materials on which the nanopowders formed by the pyrolysis systems described herein are deposited. Typically substrates will carry a plurality of different nanopowders and thereby form a combinatorial materials library. In certain embodiments, the substrate is a material having a rigid or semi-rigid surface. In many embodiments, at least one surface of the substrate will be substantially flat, although in some embodiments it may be desirable to physically separate regions for different materials with, for example, dimples, wells, raised regions, trenches, or the like. In some embodiments, the substrate itself contains wells, raised regions, etched trenches, etc. which form all or part of the synthesis regions. According to other embodiments, small beads or pellets may be provided on the surface within dimples or on other regions of the surface or, alternatively, the small beads or pellets may themselves be the substrate.

A "predefined region" or a "predetermined region" is a localized area on a substrate that is, was, or is intended to be used for deposition of a particular nanopowder (nanoparticle) population (i.e., a particular species of nanoparticle). The predefined region can have any convenient shape, e.g., linear, circular, rectangular, elliptical, wedge-shaped, etc.

The term "spatially addressable" or "spatially addressed" when used with respect to a collector or a substrate refers to a collector that can deposit nanoparticles at particular, e.g. predefined, regions on a substrate or to a substrate that has nanoparticles deposited in particular regions, e.g., a particular species of nanoparticles in one or more particular regions.

The term "radiation" when used in the context of a pyrolysis system refers to energy that may be selectively applied including energy having a wavelength between $10^{-14}$ and $10^4$ meters including, for example, electron beam radiation, gamma radiation, x-ray radiation, ultraviolet radiation, visible light, infrared radiation, microwave radiation and radio waves. A radiation source is a device that provides such radiation (e.g. a laser).

A materials library refers to a substrate bearing different materials at different locations on the substrate. In certain embodiments, the materials library can comprise a plurality of substrates.

BRIEF DESCRIPTION OF THE DRAWINGS

FIG. 5A). In anther embodiment separate radiation sources, 115a and 115b, are used for each reaction chamber 115a and 115a (see, e.g. FIG. 5B).

DETAILED DESCRIPTION

Figure 1:
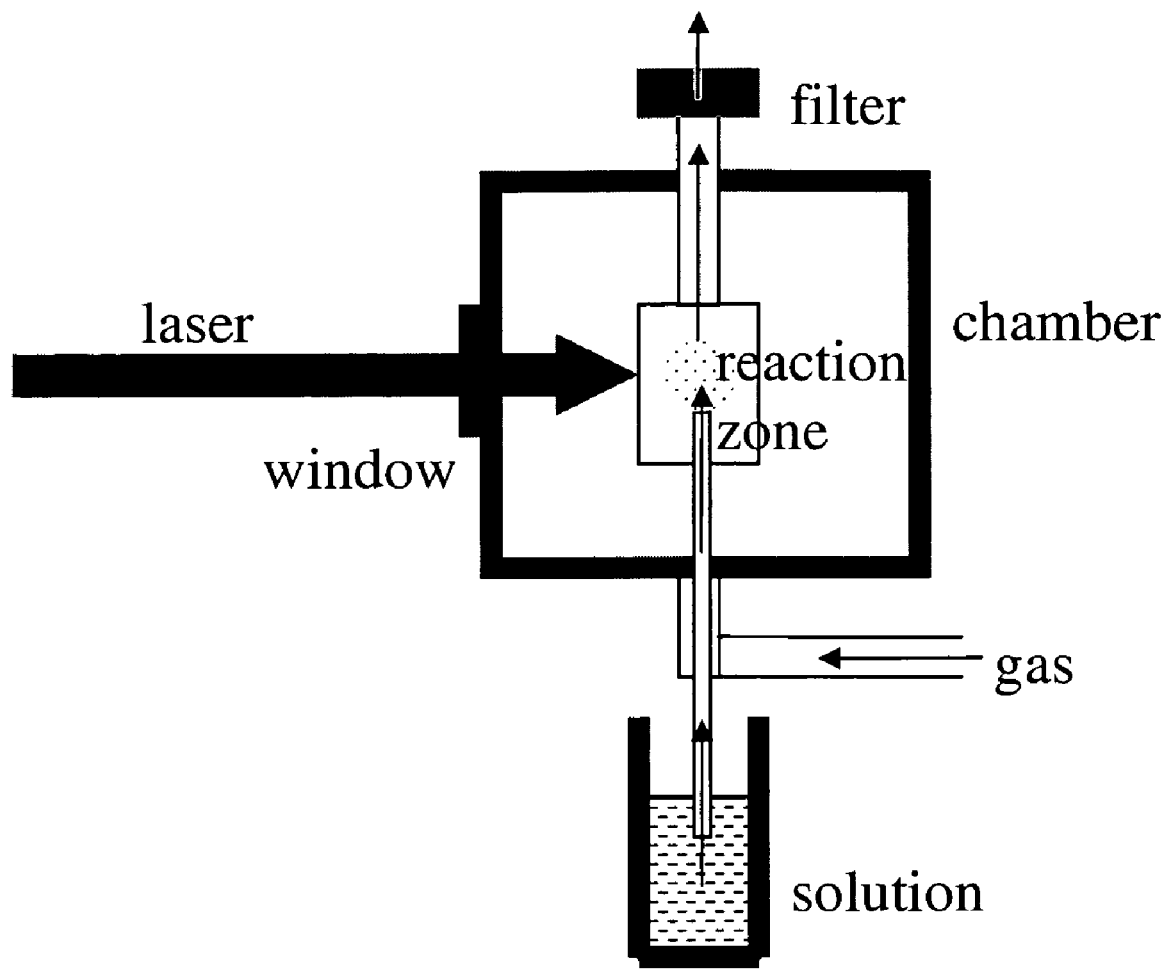
FIG. 1 illustrates a conventional laser pyrolysis system for the production of nanopowders.

This invention pertains to methods and apparatus for the preparation of he development of combinatorial materials libraries. The materials libraries comprise a "substrate" having a plurality of materials in predefined regions thereon. In certain embodiments, the library materials vary in a continuous manner with location on the substrate, while in certain other embodiments, the library materials are provided as discrete samples with different samples at different locations on the substrate.

The combinatorial materials libraries of this invention are produced by the deposition of nanopowders in a spatially addressable manner on one or more substrates. The nanopowders are produced in a pyrolytic reaction (e.g., in a laser pyrolysis device) where variation in the precursor materials over time produces a time-varying particle output which is then delivered to predetermined locations on one or more substrates by a spatially addressable particle collector. Different substrate locations thus comprise different nanoparticle materials. The nanopowder materials can vary continuously with location on the substrate or discrete different nanopowder materials can occupy discrete different locations. The substrate bearing a plurality of different nanopowders materials thus forms a combinatorial materials library.

The combinatorial materials libraries have a variety of uses. For example, the libraries can be screened for materials having certain useful properties. Properties which can be screened for include, for example, electrical, thermal mechanical, morphological, optical, magnetic, chemical, etc. More particularly, properties that can be screened for include, but are not limited to, conductivity, super-conductivity, resistivity, thermal conductivity, anisotropy, hardness, crystallinity, optical transparency, magnetoresistance, permeability, frequency doubling, photoemission, coercivity, dielectric strength, and the like.

The methods of this invention provide an approach for the systematic synthesis of large numbers of different nano-sized inorganic compounds (e.g., nanopowders) having different compositions (e.g., chemical composition, stoichiometry, particle size, etc.) and the fabrication of combinatorial libraries from the collections of these nanopowders.

It was a surprising discovery that laser pyrolysis can be particularly well suited to the fabrication of combinatorial materials. While laser pyrolysis has traditionally been used to produce highly homogenous populations of single "species" materials, we discovered that by modifying laser pyrolysis methods, e.g. as described herein, laser pyrolytic methods can be used to produce complex materials libraries that vary, e.g. in material composition, stoichiometry, particle size, and the like, in a systematic and predetermined manner.

Indeed, materials library synthesis using laser pyrolysis proved to be highly flexible in parameter control, allowed easy change of chemical composition of precursor sources, stoichiometry, and permitted the production of a narrow distribution of particle size at under particular conditions.

Conventional laser pyrolysis processes, often called photothermal processes, are well known to those of skill in the art (see, e.g., U.S. Pat. Nos. 5,958,348, 3,941,567. 6,254,928, and the like). As illustrated in FIG. 1, in this process, a radiation absorber or other precursor gaseous species absorbs energy (e.g., laser light, which results in the heating of the materials in a reaction zone causing thermally driven chemical reactions between the chemical components in the reaction zone. Typically, laser pyrolysis processes employ a precisely defined hot zone (typically 1000–1500° C.) generated, e.g., by a laser beam passing through a chemical vapor zone, in which gases thermally react to form the desired nanoscale particulate materials. The absence of wall in contact with the hot zone eliminates any contamination.

The materials formed in the pyrolytic reaction leave the hot zone typically driven by gravity or gas flow. The materials are rapidly cooled/quenched thereby forming nanoparticles with a very uniform distribution of sizes and shapes. In typical embodiments, a carbon dioxide ($CO_2$) laser is used to heat the gas molecules directly by light absorption. Another advantage of using a laser is its narrow spectral width, which allows efficient coupling between the light and the molecular precursor that has exact wavelength of absorption (over 15% of laser power consumed).

One typical example of laser pyrolysis process is the formation of silicon based ceramics, including $Si_3N_4$ and SiC. The powder formation by gas-to-particle conversion can occur via a number of chemical and physical routes. Although the temperature of the reaction zone is not very high compared to those in plasma and flame reactors, gas-heating rates of 1 million ° C./sec can be achieved. A conversion of 80% of the reactant to product is typical, and particle concentrations are often greater than $10^{10}/cm^3$ and mean particle size ranges 10–20 nm. The technology has recently extended to produce various nanosize materials from metals, metal carbides, metal nitrides and metal oxides (see, e.g., Haggerty et al. (1981) pp 165-241 In: *Laser Induced Chemical Processes*, edited by J. J. Steinfeld; Bi et al. (1993) J. Mater. Res., 8(7): 1666-1674; Bi et al. (1995) J. Mater. Res. 10(11): 2875-2884; Curcio et al. (1990) *Applied Surface Science,* 46: 225-229; Danen et al. (1984) SPIE, 458: 124-130; Gupta et al. (1984) SPIE, 458: 131-139; U.S. Pat. Nos. 5,958,348, 6,225,007, 6,200,674, 6,080,337, and the like). Therefore, it is very feasible to optimize the processing condition to form carbon-metal hydride nanopowders by laser pyrolysis process.

Figure 2:
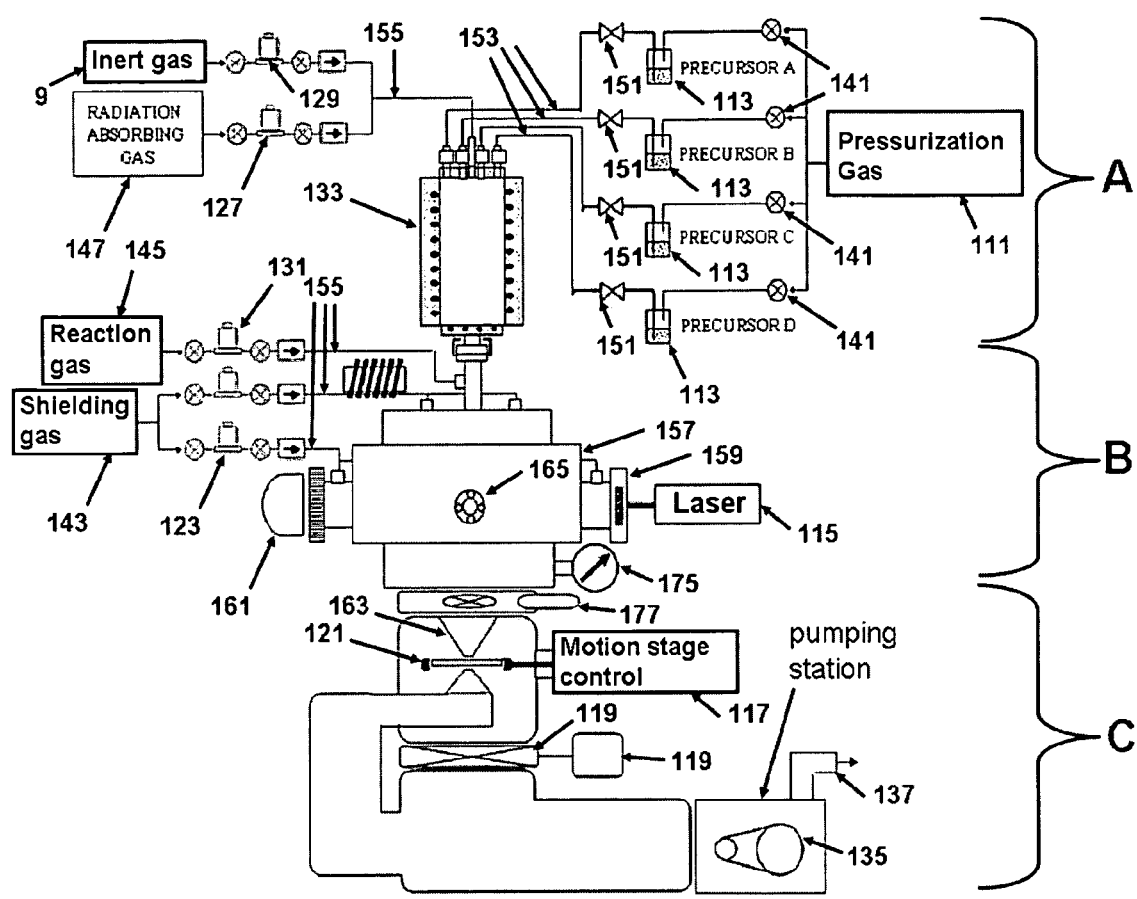
FIG. 2 schematically illustrates a combinatorial laser pyrolysis system for nano-powder production with CVD injectors and spatially addressed powder collector.

The laser pyrolysis systems used in the present invention typically produce nanopowders ranging in size from about 1 nm to about 500 nm in diameter, more preferably from about 10 nm to about 100 nm in diameter. As schematically illustrated in FIG. 2, the systems of this invention typically comprise three major sections: A) A source delivery section; B) A reaction chamber; and C) A collector that permits spatially addressable recovery of the nanopowders produced in the reaction chamber. There are numerous alternative approaches for each section. Details for the system are described as below and an example of multi-component laser pyrolysis process is presented for the formation of carbon-metal hybrid nanopowders.

Source Delivery

Figure 3:
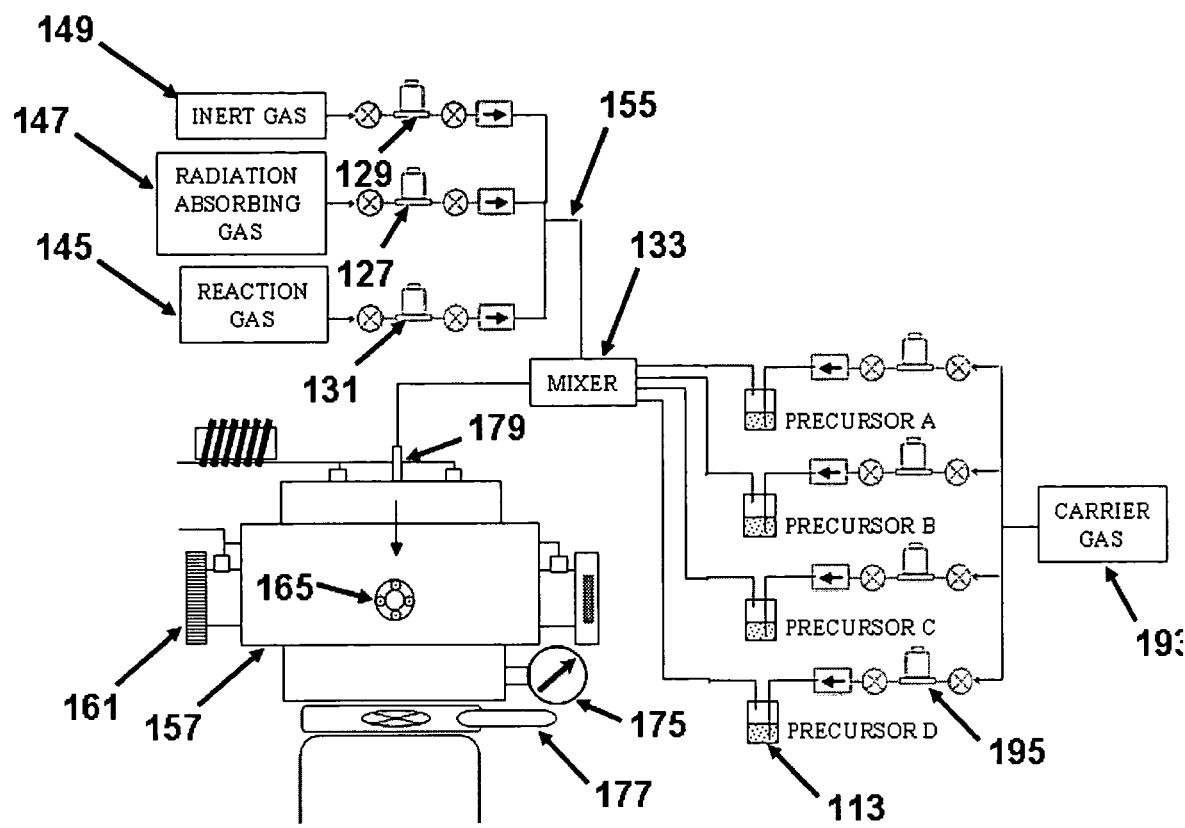
FIG. 3 illustrates an alternative source delivery system with precursor sources driven by carrier gas.

The source delivery section typically comprises a means for delivering a plurality of reactants or precursors 113 to the reaction chamber. The rate of delivery of each reactant to the reaction chamber is typically independently controllable. In various embodiments source delivery units comprise either CVD injectors (see, e.g., FIG. 2) or precursor sources driven by carrier gas (see, e.g., FIG. 3). Various precursor sources are available in this system for the synthesis of multi-component powders, including gas, liquid and solid sources. For example, sources can include metal or organometallic precursors, or reaction gases such as hydrogen, nitrogen, oxygen, or various hydrocarbon gases (e.g., hydride gas, halide gas, etc.).

In certain embodiments, the source delivery units comprises a plurality of precursor lines 153 and gas lines 155. In CVD injectors liquid sources are used while pressurizing gas 111 is applied to maintain the liquid sources to injectors 151. The gas lines can supply reaction gas 145, and/or absorbing gas 147, and and/or inert gas 149.

In some cases, one or more of the precursors 113 absorb the radiation beam sufficiently such that no additional absorbing gas 145 is required. In other cases, an additional radiation absorbing gas 145 is useful or required to improve heat transfer to the reactants. Certain preferred radiation absorbing gases for use with a $CO_2$ laser include, but are not limited to $C_2H_4$, $NH_3$, $SF_6$, and the like.

The precursor vapors and gases can be controlled independently, e.g. via gas pressure regulators 141, and/or control of the injector(s) 151 so that any composition of source mixture can be produced in a predetermined manner. In CVD injectors the frequency and duration of pulse can control the injection of precursor sources. When precursor sources are driven by carrier gas, the flow rate can be regulated by precision mass flow meters.

In addition, the radiation absorbing gas flow can be regulated by a regulator 127, and the optional inert gas 149 can be controlled by an inert gas flow regulator 129. In certain embodiments, the radiation absorbing gas supply 147 is connected through a flow controller 127 and an inert gas supply 149 is connected through a flow controller 129 to a common gas feed line 155. Inert gas can be mixed, if desired, with the radiation absorbing gas to produce a desired concentration of radiation absorbing gas flowing through the gas feed 155. The precise configuration of the inert gas supply and the radiation absorbing gas supply depends on the desired strategy for mixing the gases.

The various precursor flow controls and gas flow controls can be independently varied during continuous operation of the pyrolysis system thereby permitting precise and systematic control/variation of the reactant composition in the reactor.

In certain embodiments, the precursor lines 153 and the gas lines for the inert gas 149 and radiation absorbing gas 147 enter a mixing chamber/manifold 133 to improve homogeneity of the reactant/gas mixture prior to entry into the reaction chamber. Well mixed reactant gases generally will produce a more homogeneous reactant stream, with a corresponding improvement in the quality and quantity of the product particles. A variety of other designs can be used to mix the gases/reactants. Alternative ways can be used to connect the mixing chamber/manifold 133 with precursor lines and gas lines. The gas delivery system can optionally be heated, if desired, to help to keep certain reactants in gaseous form and to preheat the reactants prior to reaction. Similarly, the mixing chamber 133 can be heated along with the gas delivery system.

Any of a variety of precursors can be used in the pyrolysis systems of this invention. Preferred precursors include metal sources such as hydride gases, halide gasses and/or organometallic precursors. Various hydride or halide gases include, but are not limited to boron trichloride, boron trifluoride, nitrogen trifluoride, sulfur hexafluoride, silanes, chlorosilanes, silicon tetrachloride, silicon tetrafluoride, tungsten hexafluoride, carbon tetrafluoride, phosphine, phosphorus trichloride, phosphorus trifluoride, hydrogen fluoride; hydride gases (silane, germane, etc.). Some of metal source candidates include, but are not limited to metal chlorides, bromides, iodides and amides, and the like.

The most critical control parameters in the delivery of organometallic precursors are those that control vaporization. Such parameters include pressure, temperature, and carrier gas flow. To regulate these parameters, precise high temperature pressure gauges in conjunction with automatic control valves are provided in the vaporizer(s). Some of metal source candidates are metal chlorides, bromides, iodides and amides.

Reaction Chamber

In the apparatus, controlled reaction conditions are maintained within a reaction chamber 157, which is closed from the ambient environment. The intersection of the reactant stream and the radiation beam roughly defines a reaction zone 165, where the reaction is initiated. The products of the reaction form into particulate materials. The exact properties of the particles depend on the reactants and conditions within the reaction chamber. The conditions within the reaction zone are generally homogenous in order to produce relatively uniform particles, preferably nanoparticles.

As illustrated in FIG. 2, the main reaction chamber consists of a stainless steel chamber body 157 housing a reaction zone 165. The precursor(s) and/or radiation absorbing gas and/or inert gas are introduced into the reaction chamber through a one or more gas inlet(s) 179. Typically, the gas inlet 179 has a width such that the width of the resultant reactant gas stream is roughly the width of the radiation beam. In this way, neither radiation nor reactant gas is wasted significantly by being outside of the reaction zone. Alternatively, the reactant gas inlet can be made smaller than the width of the radiation beam. A smaller width produces a higher gas velocity for the same mass flow. A higher velocity generally generates smaller particle sizes, and possibly with a different crystalline structure.

In certain embodiments, the pyrolysis system includes a shielding gas supply system. An inert gas, termed a "shielding gas," 149 can be used to confine the flow of the reactant stream and to prevent reactive gases and product particles from striking the chamber walls and sensitive parts of the chamber such as optical components. This shielding layer prevent the reactant product(s) from forming depositing on the wall, reflecting mirrors, and laser lens window.

Typically a shielding gas 149 is selected that 5 does not absorb significant amounts of energy from the radiation beam. Preferred shielding gases include, but are not limited to Ar, He and $N_2$.

The shield gas flow is controlled by flow regulator 123. The shielding gas supply system can, in certain embodiments, include a plurality of inert gas stores and/or additional flow controllers. The shield gas enters the reaction chamber 157 through ports 183. Typically the ports 183 supply inert gas into the reaction chamber 157 away from the reactant stream so that reactant gases and product particles are kept away from the peripheral areas. The supply of inert gas from the ports 183 helps keep reactant gases and particulate products off of the reactant chamber walls, optics and other components within the reactant chamber 157.

In certain embodiments, the shielding gas is heated, e.g., using a heater 251, to approximately the same temperature as the reactant gases to prevent cooling of the reactant gas or precursor inlets, which can lead to condensation of reaction gases. In addition, heating the shielding gas can reduce the loss of heat from the reaction zone 165.

Radiation is introduced into the reaction chamber 157 from a radiation source 115 (see, e.g., FIG. 2). The radiation source can be separate from the reaction chamber, as depicted in FIG. 2. Alternatively, the radiation source can be constructed as an integral portion of the reaction chamber.

One preferred radiation source 115 is a laser that emits radiation at an optical frequency within the infrared, visible or ultraviolet portions of the electromagnetic spectrum where optical components can be used to control the beam. Preferred lasers include infrared lasers, especially high power carbon dioxide ($CO_2$ lasers). Carbon dioxide lasers are available that provide continuous operation with power output in the tens of kilowatt range (see, e.g., PRC Corp., Landing, N.J.). It is desirable to have a radiation source that is adjustable over a wide range of powers. In general, different particles are optimally produced at different laser powers.

In certain embodiments, radiation source 115 can be an nonlaser-optical light source, an electron beam generator, an x-ray source or a comparable radiation source or combination of sources. Some of these radiation sources may have specific requirements with respect to the design of the apparatus to direct the radiation or ultrahigh vacuum conditions to avoid unwanted absorption of the radiation. Regardless of the nature of the radiation, a preferred radiation source 115 should be able to deliver a sufficient amount of absorbable energy in a beam focused within the reaction zone 165 in the reaction chamber to produce a reasonable flow of product particles.

Radiation typically enters the reaction chamber 157 through a window 159. The window 159 can be made of any material that provides for the transmission of radiation into the reaction zone, so the choice of material depends on the type of radiation. Thus, for example, if infrared radiation is used, window 159 can be made from ZnSe. In various embodiments the window can be shaped into or further comprise one or more lenses to focus optical radiation in the reaction zone. In certain embodiments, the radiation source 115 can be located within the reaction chamber.

The radiation path can additionally include a termination section 161 that typically contains one or more optical elements. One such optical element can be a mirror to reflect radiation back into the reaction zone 165 or a window to permit transmission of radiation out of the reaction chamber. Use of a mirror as an optical element provides a higher energy density within the reaction zone since any unabsorbed radiation is reflected back into the reaction zone. If the termination section 161 contains a window, a radiation detector can be placed in the radiation path outside of the reaction chamber to measure the amount of radiation absorbed within the reaction chamber. In certain embodiments, the optical element(s) can include a partly reflective mirror to accomplish part of the functions of both the mirror and the window.

Other optical elements can be placed in the radiation path, as desired. The type of radiation generally suggests the types of materials to use to produce various optical elements.

The reaction chamber 157 can optionally include other openings. Thus, for example, a window can be located along the side of reaction chamber 157 looking into the reaction zone 165. A pyrometer can be located outside of this window to monitor the emissions of the reactants.

In certain embodiments, a pressure sensor 175 is attached to a small opening in the side of reaction chamber 157. A signal from pressure sensor 175 can be sent to a computer for monitoring the pressure in reaction chamber 157. The reaction chamber pressure is measured so that the flow can be adjusted to stabilize the chamber pressure in response to fluctuations and accumulation of particles in the collector system.

The reaction chamber can additionally, include an optional valve and valve controller 177 that can regulates particle flow through the chamber and that allows the chamber to be closed off from the collection system if necessary.

In certain preferred embodiments, the system utilizes a $CO_2$ laser beam with spot diameters from 1 to 5 mm which enters the reaction chamber through windows that are made of highly IR transparent ZnSe materials that comprise one or more plane-focus lenses. These focusing lenses allow a rectangular beam to focus in an area right below the center of reactant gas/precursor inlet(s) 179. The laser radiation intersects the gas mixture-stream formed by nebulized source precursor vapors and other reactive and absorbing gases. The opening of the inlet 179 can be designed to have a long rectangular-shaped slit which forms a gas stream parallel to the laser beam that gives rise to effective interaction between laser and source precursors.

The properties of the product particles, including particle size, crystalline structure and surface properties, vary with reaction conditions. Reaction conditions that influence particle properties include radiation intensity, reaction gas inlet length and width, reaction chamber pressure and reactant gas flow rate. Preferred chamber pressures range from very low vacuum pressures to about 1 atm, and more preferably from about 10 torr to about 500 torr. In general, a smaller reactant/precursor inlet opening(s) lead to a higher gas velocity for the same mass flow rate, resulting in a smaller particle size. A higher gas velocity produces a higher mass flow rate of reactants if other parameters are unchanged.

A higher gas velocity also results in a smaller dwell time in the reaction zone and correspondingly less heating with the same radiation energy input. Reaction chamber pressure also affects the dwell time of the reaction gases in the reaction zone. Less heating leads to a crystalline phase that forms under lower temperatures. Higher radiation power increases the reaction temperature, which can lead to the formation of higher temperature phases of the reaction product materials. The size of the reactant inlet 179 influences the quantity of total particle production.

Figure 4:
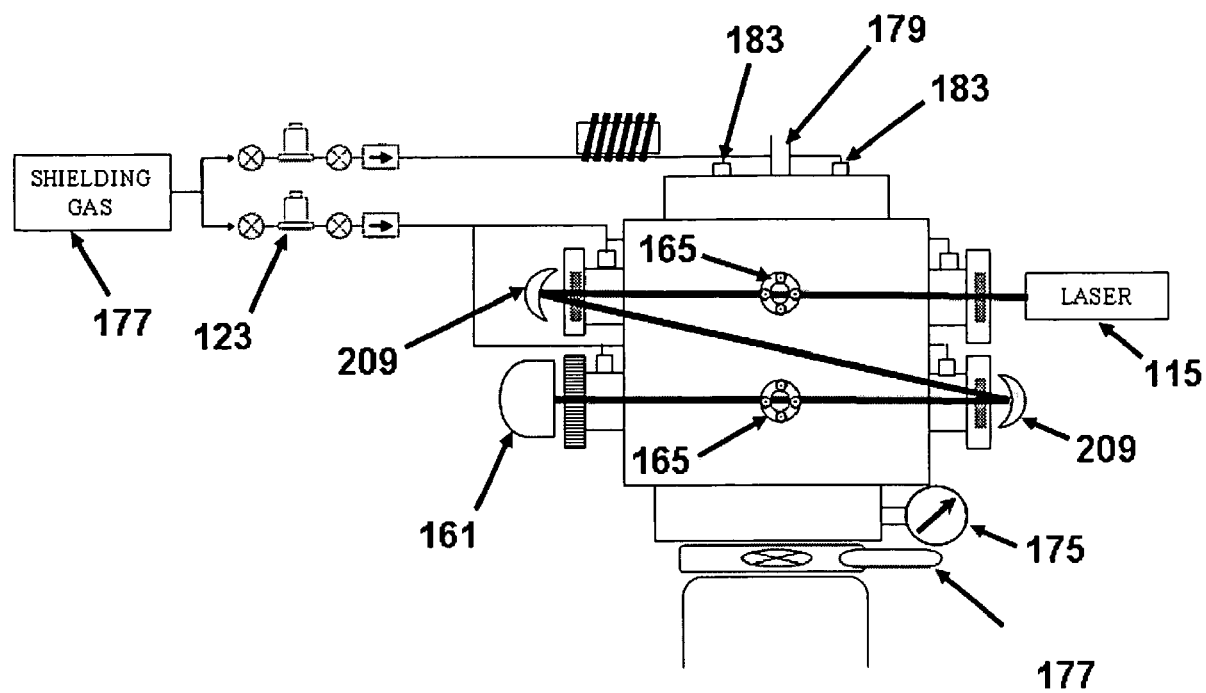
FIG. 4 illustrates laser pyrolysis with multiple laser passes

In certain embodiments, multiple laser passes are used in order to maximize gas phase reaction (see, e.g., FIG. 4). After the first pass of laser beam, the beam can be configured to keep reflecting and passing the gas-stream along the flow direction (FIG. 4) by reflecting mirrors 209, thus maximizing gas phase reaction and finally extinguished at the termination section 161.

Figure 5A:
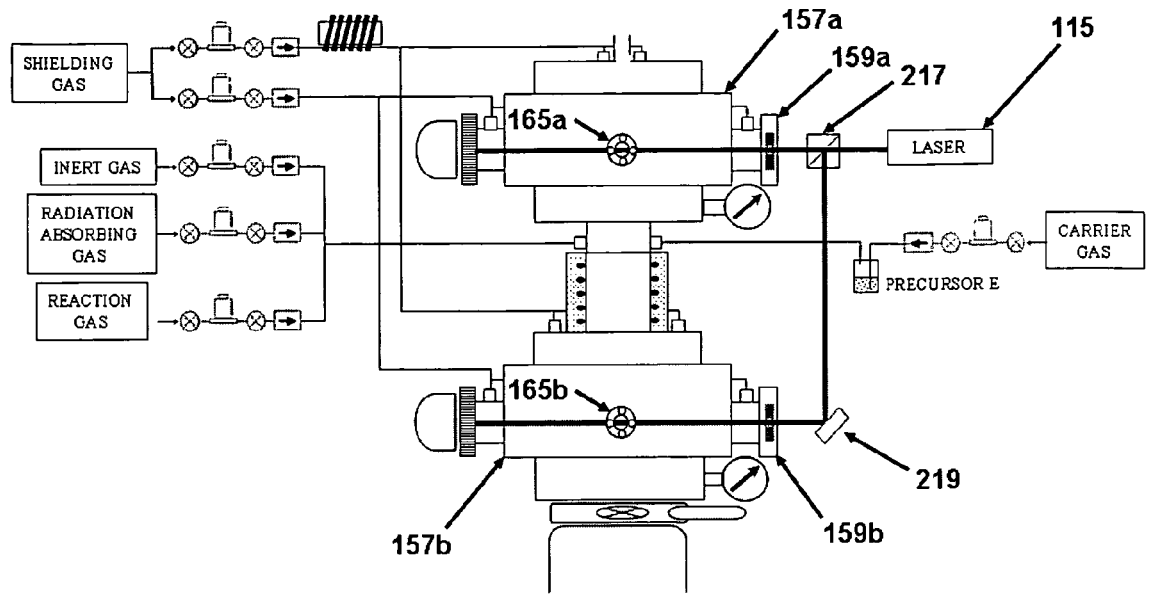
FIGS. 5A and 5B illustrate multi-step pyrolysis for combinatorial nanopowder production. In one embodiment, a beam splitter 217 is used to split the radiation from a single radiation source 115 to provide radiation for both reaction chambers, 115a and 115B (see, e.g.
Figure 5B:
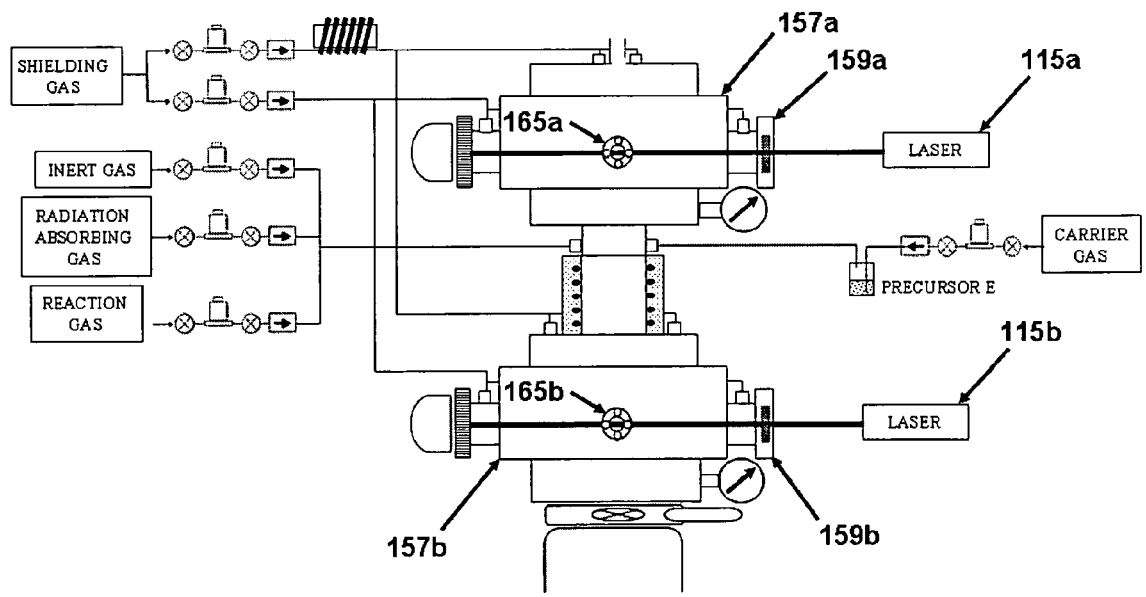

Multi-step pyrolysis is minimizes the formation of undesired composites and allows one to precisely tailor the phase and composition of powders. In certain embodiments, a double chamber system is used to address this goal where two processes are performed in sequence (see, e.g., FIG. 5a). The $CO_2$ laser beam is split into two beams using a beam splitter 217 and the two beams enter the two reaction chambers 157a and 157b through separate windows 159a and 159b. The chemical reactions in each step can be more easily controlled than one shot pyrolysis processing. Of course, it is also possible to use two independently controlled radiation sources 115a and 115b, one for each reaction chamber 157a and 157b (see, e.g., FIG. 5b).

Figure 6A:
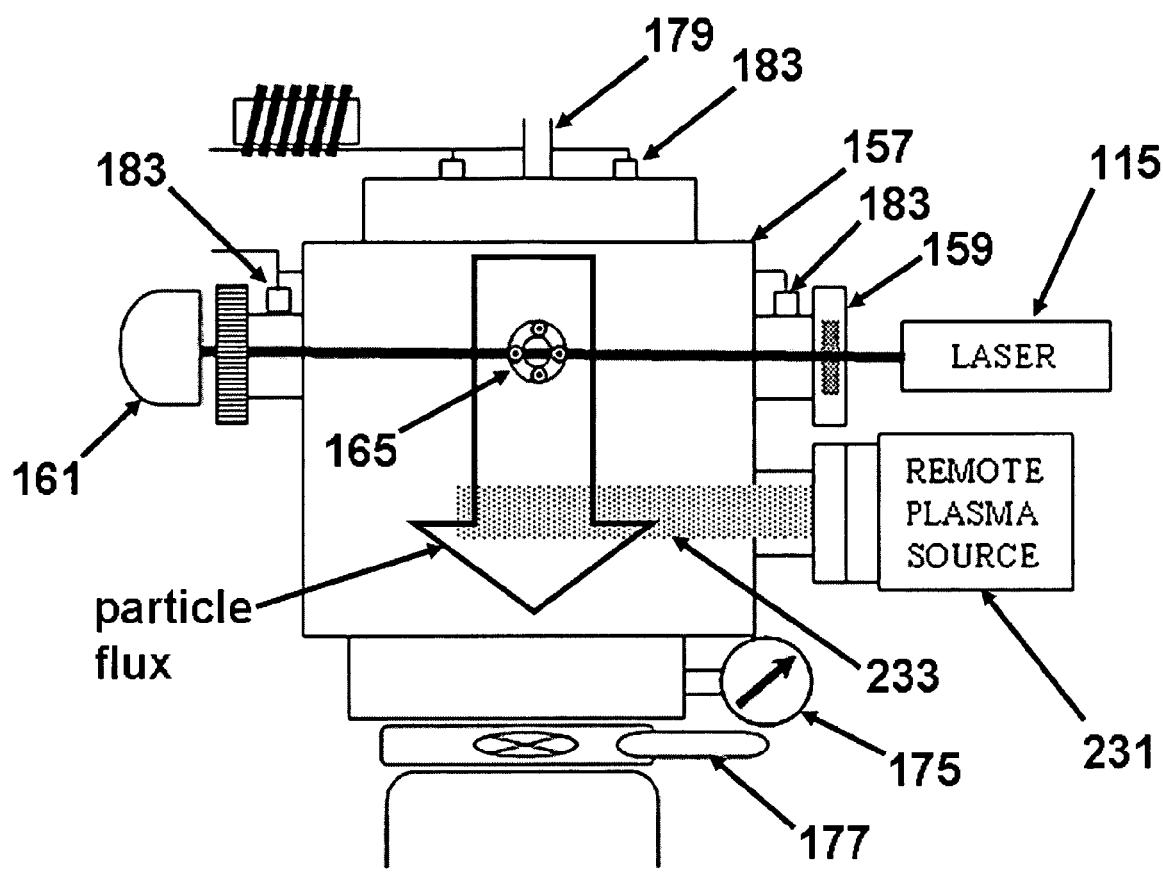
FIGS. 6A through 6C illustrate laser assisted pyrolysis using a remote plasma source. In a "post-processing" configuration (FIG. 6A) the plasma 233 is introduced after the nanoparticles are formed in the reaction zone 165. In an "in situ" configuration, the plasma 233 is introduced either before, e.g., upstream from, the reaction zone (see, e.g., FIG. 6B) or directly into the reaction zone (see, e.g., FIG. 6C).
Figure 6B:
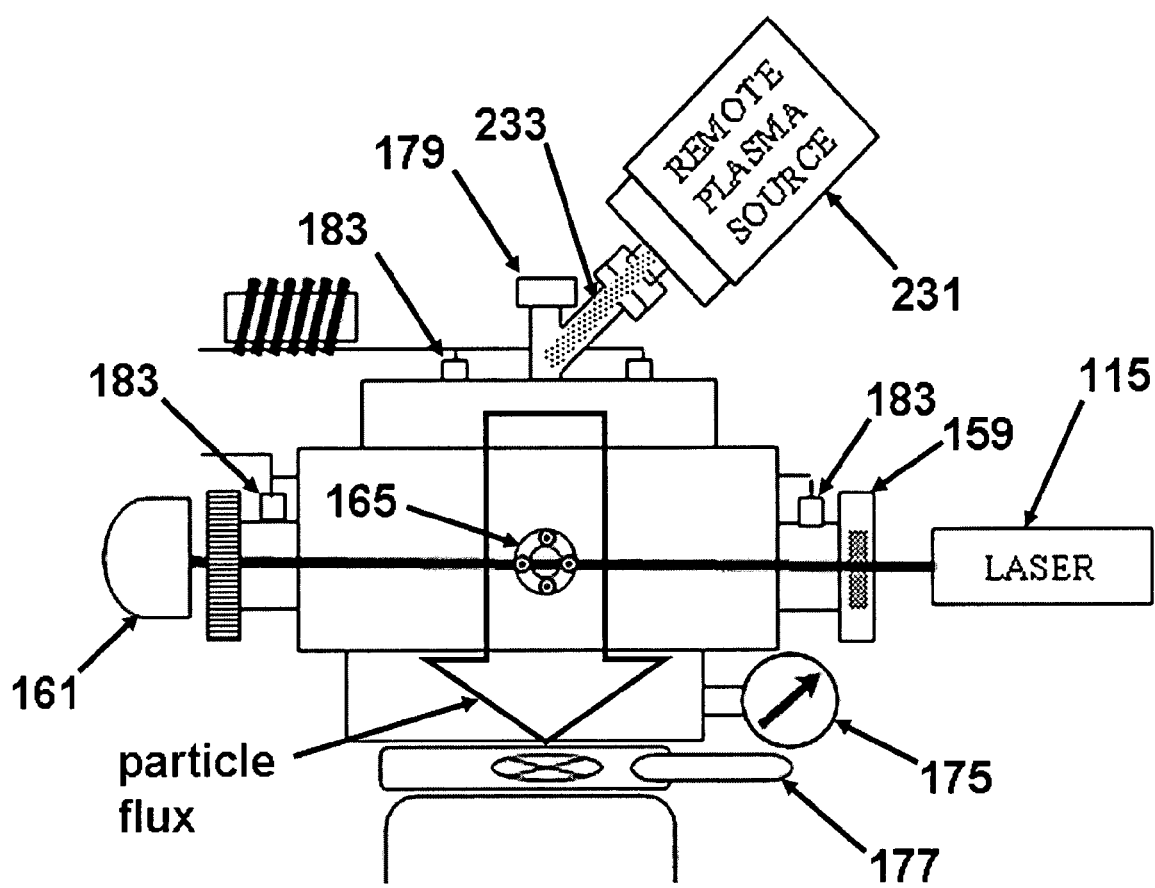
Figure 6C:
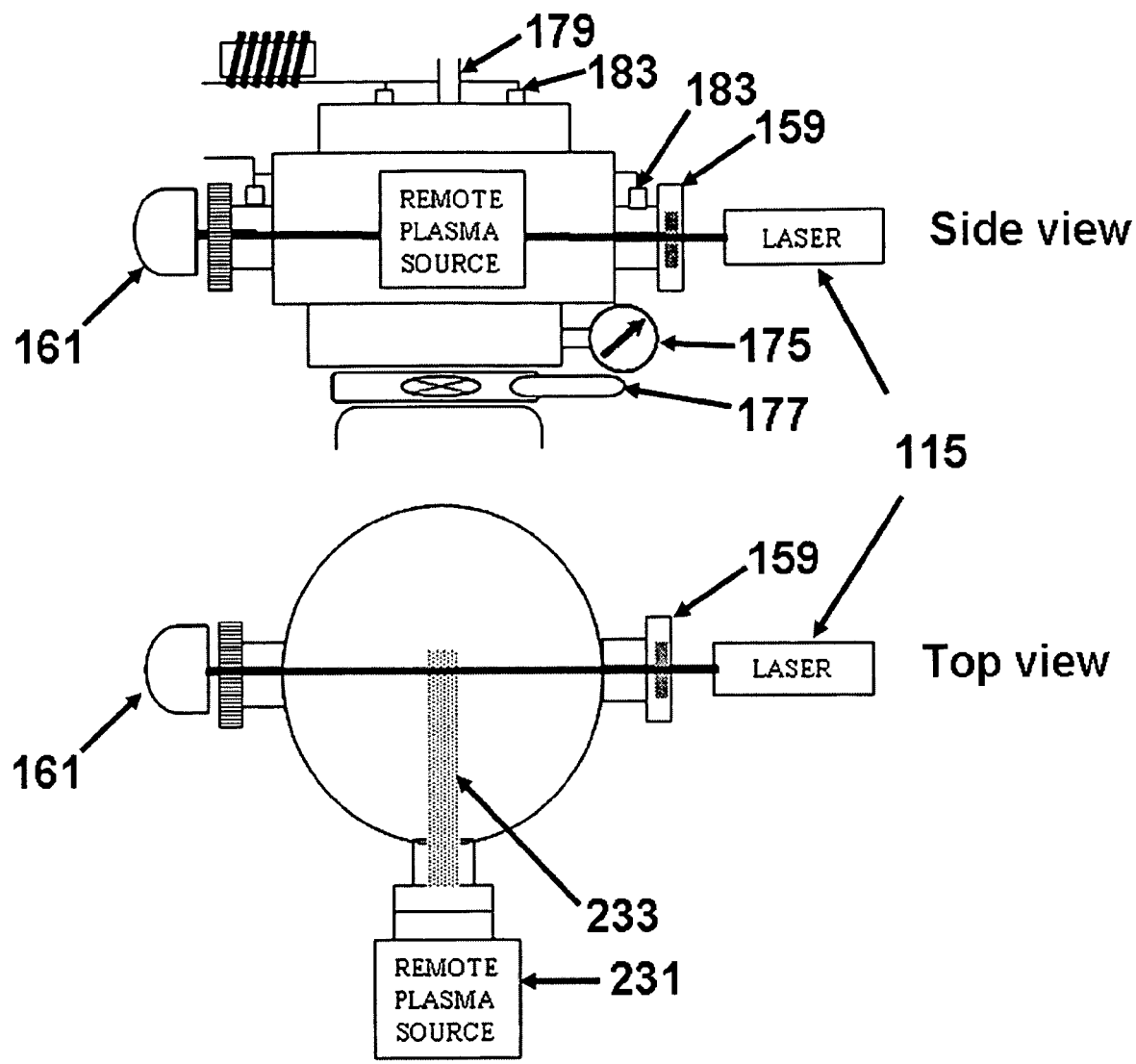

One can also introduce reactive oxygen, nitrogen, hydrogen, or other gases through a remote plasma source during the laser pyrolysis process, which is similar to the process of diamond-like carbon production (hydrogenated amorphous carbon) (see, e.g., Lin and Wu (1992) Semicond. Sci. Technol. 7: 233-238. The use of remote plasma sources is illustrated in as shown in FIGS. 6A through 6A. In certain "post-processing" configurations the plasma 233 is introduced into the particle flux by the plasma source 231 after the particles leave the reaction zone 165 (see, e.g., FIG. 6A). In certain in situ configurations, the plasma 233 is introduced upstream of the reaction zone (see, e.g., FIG. 6B) or directly into the reaction zone (see, e.g., FIG. 6C). Various remote plasma sources include, but are not limited to RF or microwave sources.

Spatially Addressable Powder Collection.

The nanopowders formed in the pyrolysis systems described herein follow the gas flow downstream along the pumping direction. The nanopowders are collected on a substrate 325 by a using a spatially addressable collector 121 (see, e.g., FIG. 2). The spatially addressable collector permits the nanopowders(s) to be deposited at particular, e.g. predetermined, locations on the substrate and the location(s) can be changed as will either continuously or in discrete increments.

In certain embodiments, the spatially addressable collector comprises a movable stage that holds the substrate, and that can move in one (X), two (X-Y), and in certain embodiments, even in 3 directions (X-Y-Z). Most typically the spatially addressable collector provides movement in two directions, X and Y. In certain embodiment, the position of the substrate is fixed and mask is placed above the substrate and the mask only allows nanopowders particles to deposit at particular location(s) on the substrate. The mask can be moved continuously or in discrete steps and/or it can be removed and replaced with a different mask.

Figure 7:
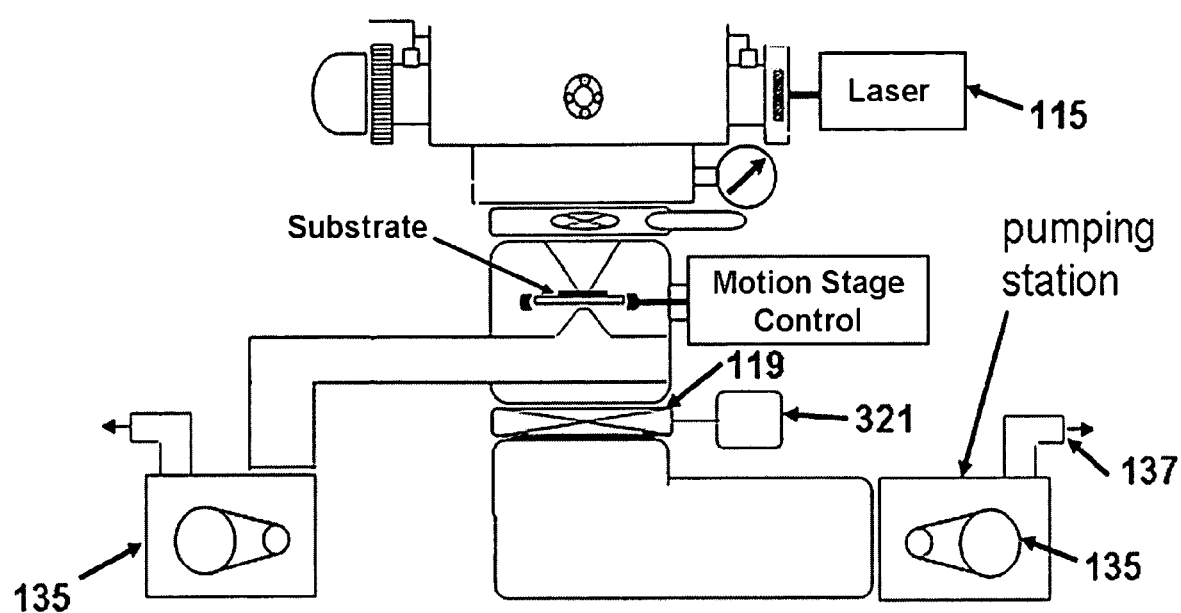
FIG. 7 illustrates an alternative pumping scheme for the spatially addressed powder collector.

A differential pressure between the area of collection and the reaction chamber is created by differential pumping. The differential pumping can be installed by connecting the collection port to the main pumping, i.e., bypassing an automatic pressure control valve 119 (FIG. 2). In various embodiments, one can directly connect the collection port to a separate pumping source 135 (see, e.g., FIG. 7).

As input sources (e.g., precursors, plasma sources, reaction gases, etc.) are continuously changed with time at, e.g. to produced predetermined compositional ratio, the resulting nanopowders are collected by the spatially addressable particle collector (e.g., a moving in situ membrane tray. The membrane tray could be movable in linear and/or two-dimensional motions by linear or x-y motion guide with time.

A wide variety of substrates can be used with the pyrolysis systems of this invention to form combinatorial materials libraries. In certain embodiments, the substrate is a material having a rigid or semi-rigid surface. The surface can be solid or porous or fibrous. In many embodiments, at least one surface of the substrate will be substantially flat, although in some embodiments it may be desirable to physically separate regions for different materials with, for example, dimples, wells, raised regions, trenches, or the like. Certain substrates comprise a collection of wells or vials (e.g., a microtiter plate).

In certain preferred embodiments, the substrate is porous and made from teflon, glass fibers, or any material or combination of materials that do not significantly react with the reactant compounds or nanopowders particles. In certain embodiments, the pore sizes of the substrate material preferably range from about 0.1 micrometer to about 1 micrometer. Typical substrate materials include, but are not limited to membranes and/or filters of various materials such as stainless steel, alloys, carbon, zeolite, etc.

Figure 8:
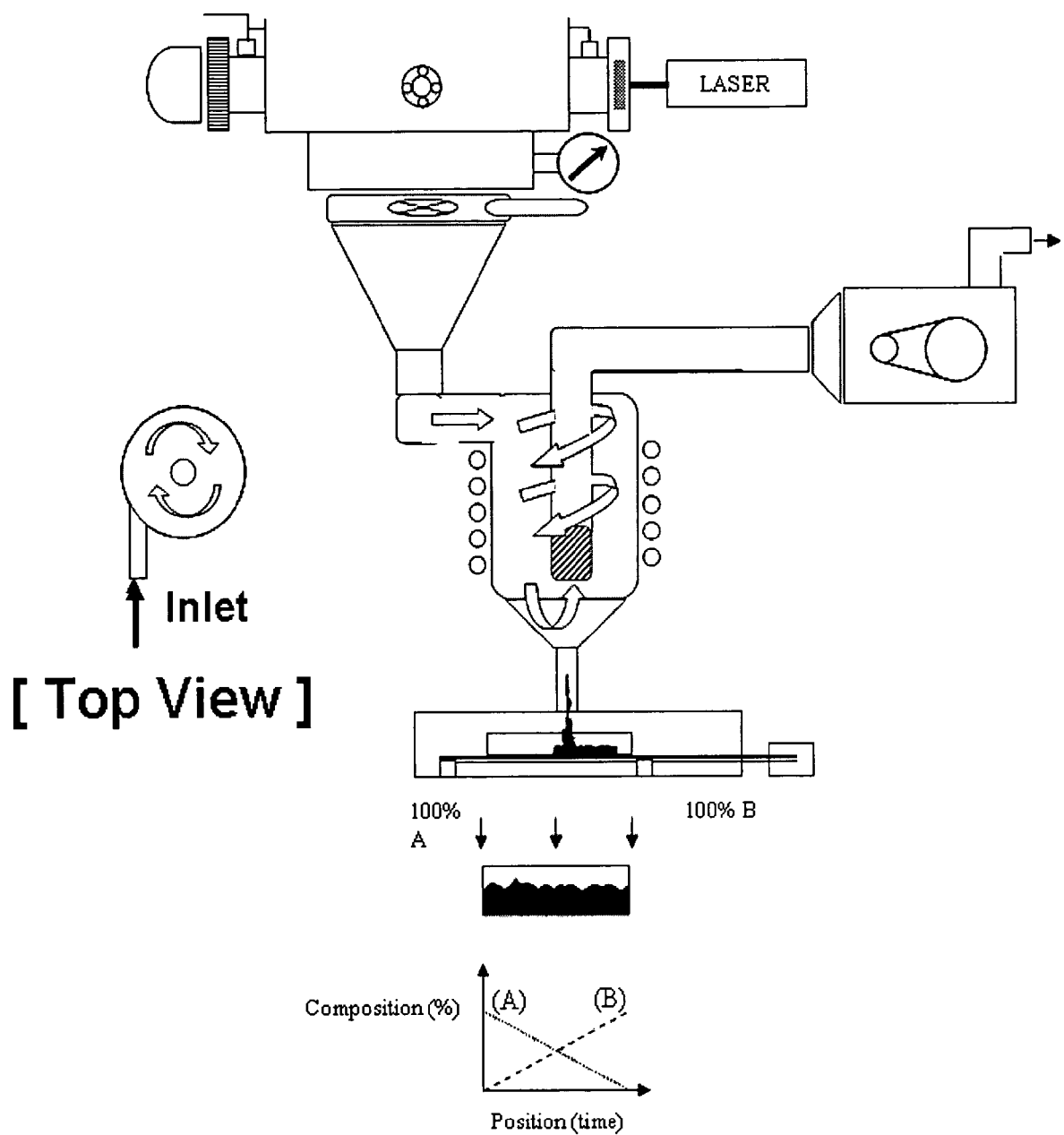
FIG. 8 illustrates a cyclotron powder collector and the collection of combinatorial nanopowder library with continuous composition change.

In certain embodiments, the nanopowders(s) can be collected by a means of cyclone particle trap (FIG. 8). An off-centered inlet port creates a cyclotron movement of the particle stream, that helps to retain particles longer inside the trap and finally collect particles in a tray. At the exit port of the cyclotron trap, a stainless steel porous membrane is installed to prevent unscreened nanoparticles from escaping.

In certain embodiments, the rate of fabrication of a combinatorial library is limited by the flow of the shielding gas(es) and/or reaction gases. In such instances, when the flow rate of the pyrolysis system is increased, the flow of the shielding gas(es) and/or reaction gases is also increased. When the higher velocity shielding gas/reaction gas strikes the substrate it tends to disperse the particular nanoparticles produced at that moment over a wider area on the substrate. The different species of nanoparticles then tend to intermix.

Figure 9:
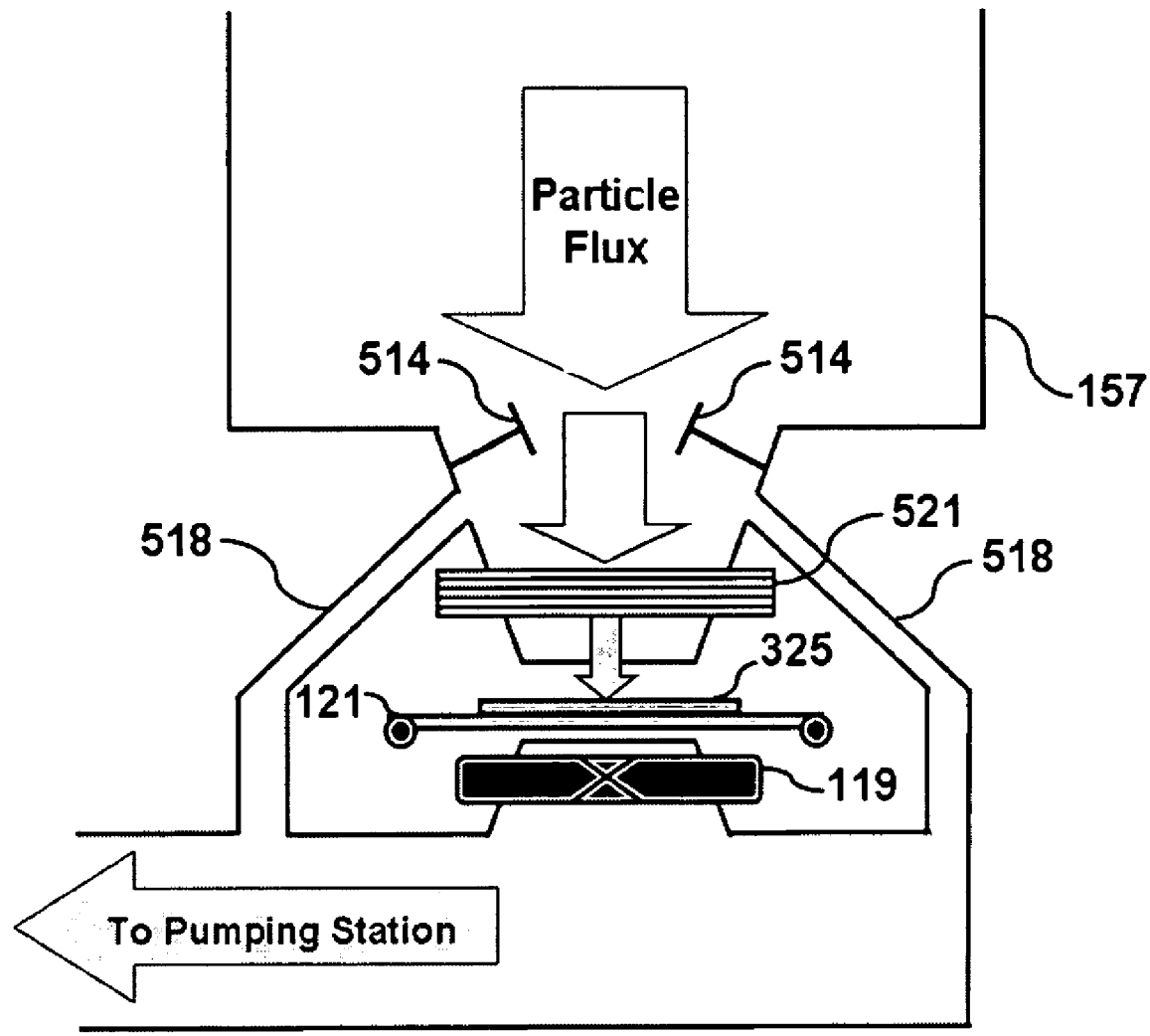
FIG. 9 illustrates the use of an electrostatic focusing system to direct nanoparticle deposition.
Figure 10:
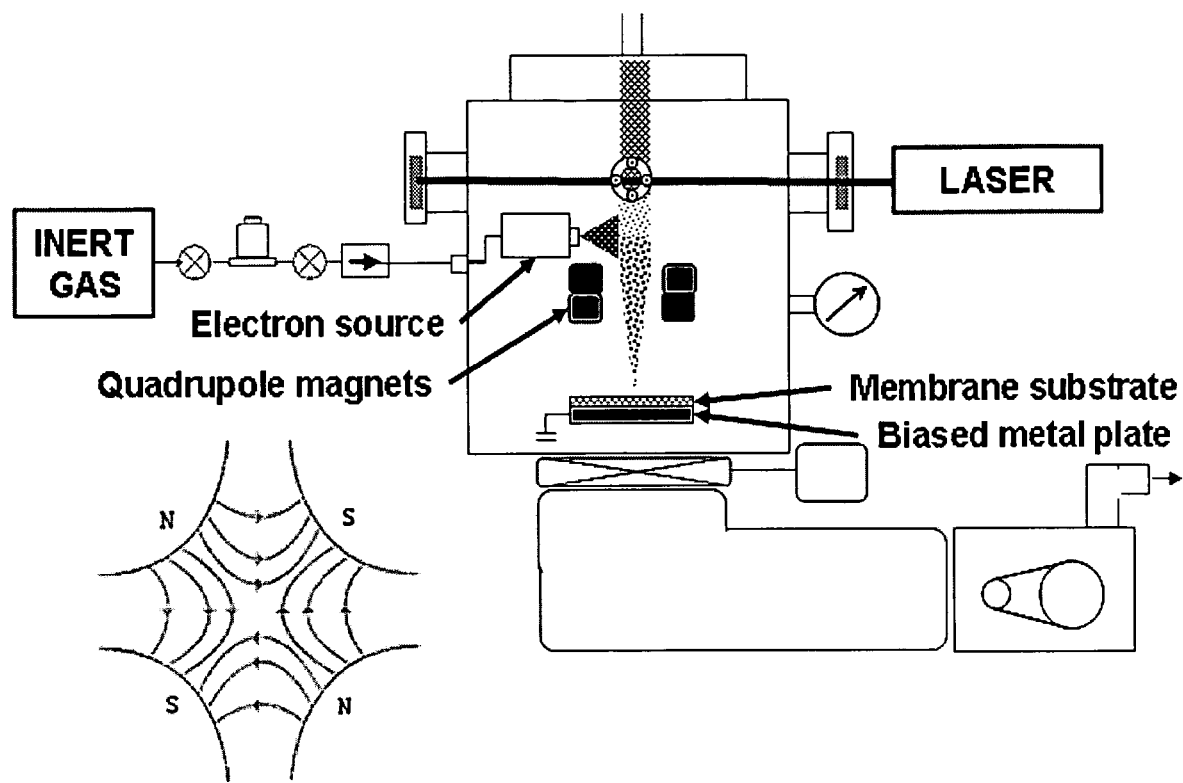
FIG. 10 illustrates an embodiment in which an electron source bombards the nano-powders right after their generation, i.e., laser beam path. The particles can be ionized 90-100% in an optimized ionizing environment. Charged particles are magnetically focused and biased toward the substrate to deposit. Magnets can be "steered" to perform spatially addressable powder collection.
Figure 11:
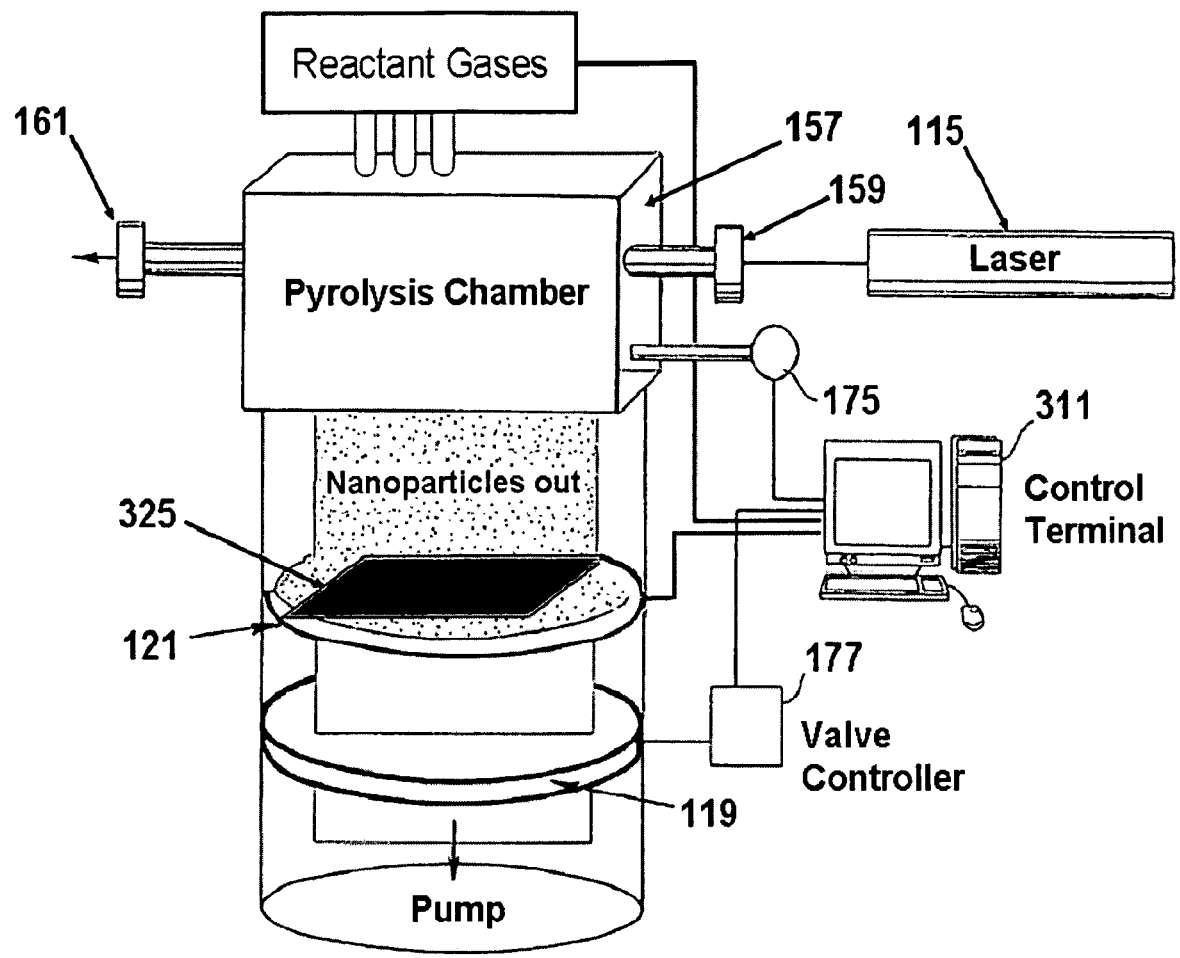
FIG. 11 illustrates computer control of a laser pyrolysis system of this invention.

This can be obviated in certain embodiments by the use of a configuration such as the one schematically illustrated in FIG. 9. In certain embodiments the gas(es) can be vented through ports to the outside environment and/or through venting lines 518 that ultimately lead to a pumping station. Prior to the venting ports, the pyrolysis device (collection apparatus) is provided with charge elements (e.g. charged plates) that put an electrostatic charge on the nanoparticles. The nanoparticles can then be focused onto the substrate (out of the diverted gas stream) by the use of one or more focusing elements 521 (e.g., magnetic or electrostatic focusing elements/lenses). In addition, the rate of nanoparticles deposition can optionally be increased by the use of magnetic or electrostatic acceleration elements that are component of the focusing element(s) and/or that are provided above-and/or below the focusing element(s) in the particle stream.

In certain embodiments, the focusing elements can be used to eliminate the movable stage. The site of nanoparticles deposition can simply be controlled by the focusing element(s).

As noted above, product particles, unreacted reactant gases and inert gas exit the reaction chamber and enter collection system (spatially addressable collector). The collection system typically has a lower pressure than reaction chamber to provide a flow from reaction chamber into the collection system. The spatially addressable collection system serves to collect flow from the reaction chamber, to isolate reactant particles and to remove unreacted and inert gases for venting or recycling. In addition to the spatially addressable particle collector described above, the collection system can have a variety of other components to achieve these purposes.

In certain embodiments, the collection system can include a particle size analyzer. Real time measurement of particle size permits adjustment of gas flows to generate a desired range of particle sizes. A typical particle size analyzer includes a plurality of light scattering detectors and a window to provide a light beam to impinge on the particle stream coming from the reaction chamber into the spatially addressable collector. A laser provides a convenient light source for light scattering measurements, although other comparable light sources can be used. The measurements from the scattering detectors can be used to estimate the distribution of particle sizes.

The particle size analyzer can be interfaced with computer both to monitor the reaction products and to provide feedback with respect to reaction conditions as the reaction progresses. In this way, laser intensity, chamber pressure and various reactant gas flow rates can be adjusted on a real time basis according to measurements of particle size distribution and degree of agglomeration.

In certain embodiments, the pyrolysis system comprises an automatic valve 119 and an automatic valve controller 177. Flow from the automatic valve goes through a conduit and then to a pump 135. The pump 135 has an exhaust 137 for venting the gases or collecting the gases for recycling. Preferred pumps include mechanical pumps capable of handling large volumes of gas without significant loss of pump oil. Appropriate pumps are sold, for example, by Busch Inc., Virginia Beach, Va.

Accumulation of product particles on the substrate 325 can decrease the pumping speed of the system. A decrease in the pumping speed would result in an increase in the pressure in the reaction chamber 157. Since particle properties such as size and crystallinity depend sensitively on the chamber pressure, in certain embodiments, the chamber pressure is stabilized during synthesis.

As noted above, the automatic valve 119 between the pump 135 and the spatially addressable collector 121 can be used to regulate pumping efficiency. The control signal from a pressure sensor 175 mounted on the reaction chamber 157 can be used to control the opening and closing of valve 119 to compensate for pressure changes resulting from the gradual accumulation of powders on the substrate.

Typically, the pyrolysis systems of this invention are controlled by computer systems 311 (see, e.g., FIG. 8). The computer 311 can monitor and control reactant flow rates, shielding gas flow rates, reaction gas flow rates, inert gas flow rates, system pressure and pumping rates, the position of the spatially addressable collector, and the like. A variety of processors can be used for the control computer 311, and standard data acquisition and control interfaces can be utilized. Thus, for example, in certain embodiments, the computer 311 is interfaced by way of I-EEE protocols, although other types of interface protocols can be used.

In certain embodiments, the computer 311 is programmed with a program that selects appropriate reactants, and reaction conditions for each nanopowders and then appropriately instructs the spatially addressable collector to deposit each nanopowders at a particular preselected location on the substrate.

Preparation of Combinatorial Libraries

Combinatorial materials libraries are readily prepared using the pyrolysis system described above. Typically, the reactants needed for the desired reactions are selected. Then it is determined whether a radiation absorbing gas is needed to transfer energy to the reactant molecules. The configuration of the reactant supply system can be adjusted based on the total number and characteristics of the reactants and the presence or absence of a radiation absorbing gas.

Gas flow is initiated at the desired pressures to produce the reactant stream and the shielding gas streams. Simultaneously, the radiation source is initiated and directed to the reaction zone. The product particles exit the reaction chamber and are deposited by the spatially addressable powder collector at a first predefined region on the substrate. Then the reactants (precursors) and/or gas flow rates and/or radiation intensity, and/or pumping rates are to produce different particles and the different particles are deposited at a second (typically different) predefined region on the substrate. The process is typically repeated again to produce a third particle at a third predefined region on the substrate and so forth until the substrate bears all the different desired particle types thereby forming a library of these different particle types (material types). In certain embodiments, the substrate bears at least two different particle types (species), preferably at least four or at least ten different particle types (species), more preferably at least 15, 20, 25, or 50 different particle types (species), and most preferably at least 100, 500, 1000, 5000, or 10,000 different particle types (species). It will be appreciated that the reactants (precursors) and/or gas flow rates and/or radiation intensity, and/or pumping rates can be varied without stopping the pyrolysis reaction.

In certain embodiments, the reactants (precursors) and/or gas flow rates and/or radiation intensity, and/or pumping rates are varied continuously during operation of the pyrolysis device and the spatially addressable collector continuously varies the portion of the substrate receiving particles to produce a continuous gradient varying in one or more material properties.

The reaction can be run until the desired quantity of particles are produced. The gas flow into the reaction chamber then can be stopped if desired. If there are appropriate valves, these can be used to isolate the particle collector and/or change substrates while maintaining the other parts of the system in isolation from the ambient air. Alternatively, a switch valve can be included that can direct the product particles to a second addressable particle collector for fabrication of a second library.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An apparatus for producing a multi-component nanopowders, said apparatus comprising:

a reaction chamber comprising a cavity that includes a reaction zone;

one or more reactant inlets for introducing a plurality of precursors into said reaction chamber whereby said precursors produce a multi-component precursor flux that forms a particle stream through said reaction zone;

at least two precursor sources that introduce precursors into said reaction chamber through said one or more reactant inlets such that each individual precursor flux can be independently controlled so that the composition of the multi-component precursor flux can be varied with time;

a heater able to heat reaction zone to a temperature of at least about 800° C.; and a spatially addressable collector deposits different nanopowders at different locations on a substrate wherein said spatially addressable collector comprises a cyclone particle trap.

2. The apparatus of claim 1, wherein said spatially addressable collector comprises a movable stage that alters the position of said substrate in the particle stream produced by said apparatus.

3. The apparatus of claim 1, wherein said spatially addressable collector comprises a movable mask that selectively exposes different locations on said substrate to the particle stream produced by said apparatus.

4. The apparatus of claim 1, wherein said spatially addressable collector comprises a plurality of collecting chambers held in a movable support whereby different chambers can be positioned to receive nanopowder particles at particular times during a synthesis cycle.

5. The apparatus of claim 1, wherein said spatially addressable collector comprises a substrate held in a movable support whereby different regions of said substrate can be positioned to receive nanopowder particles at particular times during a synthesis cycle.

6. The apparatus of any of claim 1 wherein said spatially addressable collector is movable in an x and/or y direction.

7. The apparatus of claim 1, wherein said apparatus comprises at least three precursor sources.

8. The apparatus of any of claim 1 wherein said one or more reactant inlets comprises a plurality of reactant inlets there being one inlet for each of said precursor sources.

9. The apparatus of claim 1, wherein said precursor sources comprise vaporization injectors.

10. The apparatus of claim 1, wherein said precursor sources comprise a fluidized precursor delivery system driven by a carrier gas.

11. The apparatus of claim 1, wherein said one or more reactant inlets comprises a means for introducing one or more gases selected from the group consisting of an inert gas, a radiation absorbing gas, and a reaction gas.

12. The apparatus of claim 1, wherein said precursors are selected from the group consisting of a hydride gas, a halide gas, an inorganic compound, and an organometallic compound.

13. The apparatus of claim 1, wherein said one or more reactant inlets comprises a single reactant inlet wherein each of said precursor sources introduces a precursor through said single reactant inlet.

14. The apparatus of claim 1, wherein said heater comprises a laser configured to provide multiple reflective passes of a beam through a reactant gas stream in said reaction zone.

15. The apparatus of claim 1, wherein said heater comprises one or more of a furnace and a remote plasma source.

16. The apparatus of claim 1, wherein said apparatus further comprises
a second reaction chamber comprising a cavity that comprises a second reaction zone;
one or more second reactant inlets for introducing a second plurality of precursors into said second reaction chamber whereby said second plurality of precursors forms a particle stream through said second reaction zone;
one or more second precursor sources that introduce second precursors into said second reaction chamber through said one or more second reactant inlets; and
a heater capable of heating said second reaction zone to a temperature of at least about 800° C.

17. The apparatus of claim 16, wherein said apparatus further comprises
a third reaction chamber comprising a cavity that comprises a third reaction zone;
one or more third reactant inlets for introducing a third plurality of precursors into said third reaction chamber whereby said third plurality of precursors forms a particle stream through said third reaction zone;
one or more third precursor sources that introduce third precursors into said third reaction chamber through said one or more third reactant inlets; and
a heater capable of heating said third reaction zone to a temperature of at least about 800° C.

18. A method of fabricating a materials library, wherein said method comprises:
feeding a plurality of precursors into one or more reaction chambers of an apparatus according to claim 1 to form nanopowder particles having a first composition;
collecting said nanopowder particles having a first composition at a first predefined region on a substrate;
varying the composition or ratios of said precursors and/or of a gas in said one or more reaction chambers to form nanopowder particles having a second composition different from said first composition; and
collecting said nanopowder particles having a second composition at a second predefined region on said substrate where said second predefined region is different than said first predefined region thereby forming a substrate comprising different nanopowder species at different locations.

19. The method of claim 18, wherein the composition or ratios of said precursors and/or of a gas in said one or more reaction chambers is continuously varied and the location that nanopowders are deposited on said substrate is continuously changed to provide a gradient of nanopowders materials on said substrate.

20. The method of claim 18, wherein the composition or ratios of said precursors and/or of a gas in said one or more reaction chambers is varied during continuous operation of said apparatus and different nanopowders are deposited at different discrete locations on said substrate.

21. The method of claim 18, wherein said varying the composition or ratios of said precursors or of a gas in said one or more reaction chambers is performed during continuous operation of said apparatus.

22. The method of claim 18, wherein said method forms at least two different species of nanopowder particle each nanopowder species being disposed at a different location on a substrate.

23. The method of claim 18, wherein said method forms at least 10 different species of nanopowder particle each nanopowder species being disposed at a different location on a substrate.

24. The method of claim 18, wherein said nanopowder particles have an average size of less than about 100 nm.

25. A substrate comprising at least two different species of nanopowder particles, each species of nanopowder particle being located at a different predetermined region of said substrate.

26. The substrate of claim 25, wherein said substrate comprises at least 10 different species of nanopowders particle.

27. The substrate of claim 25, wherein nanopowders particles are continuously distributed along one or two dimensions of said substrate and the composition of said nanopowder particles varies substantially continuously along said one or two dimensions.

* * * * *